United States Patent [19]
Chawla et al.

[11] Patent Number: 5,812,640
[45] Date of Patent: *Sep. 22, 1998

[54] SYSTEM AND METHOD FOR USING ALTERNATIVE SWITCH ANNOUNCEMENTS IN ADVANCED INTELLIGENT NETWORK SERVICES

[75] Inventors: Sandeep Chawla, Alpharetta, Ga.; John G. Cameron, Jr., Birmingham, Ala.

[ * ] Notice: This patent issued on a continued prosecution application filed under 37 CFR 1.53(d), and is subject to the twenty year patent term provisions of 35 U.S.C. 154(a)(2).

[73] Assignee: BellSouth Corporation, Atlanta, Ga.

[21] Appl. No.: 592,286

[22] Filed: Jan. 26, 1996

[51] Int. Cl.$^6$ ....................................................... H04M 1/64
[52] U.S. Cl. .............................. 379/89; 379/210; 379/230
[58] Field of Search .................................. 379/67, 88, 89, 379/230, 210, 214, 243

[56] References Cited

U.S. PATENT DOCUMENTS

| | | |
|---|---|---|
| 4,611,096 | 9/1986 | Asmuth et al. ........................... 379/230 |
| 4,922,490 | 5/1990 | Blakley . |
| 5,212,727 | 5/1993 | Ramkumar . |
| 5,321,740 | 6/1994 | Gregorek . |

*Primary Examiner*—Fan S. Tsang
*Attorney, Agent, or Firm*—Jones & Askew, LLP

[57] ABSTRACT

In a public switched telephone network, a method and system are provided for utilization of regular non-intelligent switch announcements for announcement provision for intelligent network services calls. A call received in the network and directed to a particular number has its identification information read and compared to entries in a database. If the call requires announcement treatment, a unique carrier identification code is assigned to the call identification information which causes the intelligent facilities of the network to route the call to a regular non-intelligent switch announcement frame resident in the non-intelligent network facilities at a central office switch. The regular non-intelligent switch announcement frame provides an announcement to the calling party.

18 Claims, 3 Drawing Sheets

Fig_1

Fig. 2

SYSTEM AND METHOD FOR USING ALTERNATIVE SWITCH ANNOUNCEMENTS IN ADVANCED INTELLIGENT NETWORK SERVICES

FIELD OF THE INVENTION

This invention relates in general to telephony and more particularly to a method and system of using regular non-intelligent switch announcements in intelligent switched telephone network services.

BACKGROUND OF THE INVENTION

In recent years, the dramatic increase in the demand for telecommunications services has led to the use of automated announcement facilities that provide a variety of announcements to telephone services subscribers. A typical announcement is exemplified by the familiar recorded voice which instructs that "the number you have dialed is not in service—please hang up and try your call again." Typically, announcements are provided to a calling party from announcement hardware and software resident at the calling party's local switch or at some alternative switch designated by the telephone network in which the call is processed.

Because the modern public switched telephone network (PSTN) forms the basic environment of the present invention, it is advantageous to briefly discuss the operation and capabilities of the modern public switched telephone network. The modern public switched telephone network has separate signaling paths for voice signals (or other customer-utilized communication circuits) and for control signals, which include information transmitted throughout the network to control the connection and disconnection of the voice circuits. The modern public switched telephone network is contrasted with earlier versions of public switched telephone network in which tone signals were transmitted over the same circuits used as voice paths to control set-up and takedown of calls, to create billing records, and to provide other control for the telephone network.

In the late 1970s and early 1980s, American Telephone & Telegraph Company (AT&T) developed early species of common channel interoffice signaling (CCIS). CCIS is essentially a network architecture for a switched telephone network in which information about a telephone call is transmitted over high speed data links that are separate from the voice circuits that are used to transmit the signals of the call itself. Early in the development of common channel interoffice signaling, it was recognized that the interoffice data signaling links could be designed to provide high speed digital data that could first determine whether a call could be completed prior to assigning trunk capacity to set up the voice link. Thus, with common channel interoffice signaling the identity of the called number can be transmitted over the interoffice signaling data links from the originating central office to the terminating central office, which is the central office that services the called number. If the called number is busy, data representing this information is transmitted back over the interoffice signaling link to the originating central office that locally provides an audible busy signal to the caller. Therefore, no long distance trunk capacity is occupied during this process, and the voice circuits remain free for other uses. If the called number is not busy, various devices in the network respond to the information about this call to assign interoffice trunks to set up a connection for the call. While the call is being set up, the originating central office, based on a signal from the terminating central office, returns an audible ring back tone (RBT) to the caller. Once the called number is answered, an answer signal is passed from the terminating central office to the originating central office, the ring back tone is terminated, and the call is completed.

Figure 1:
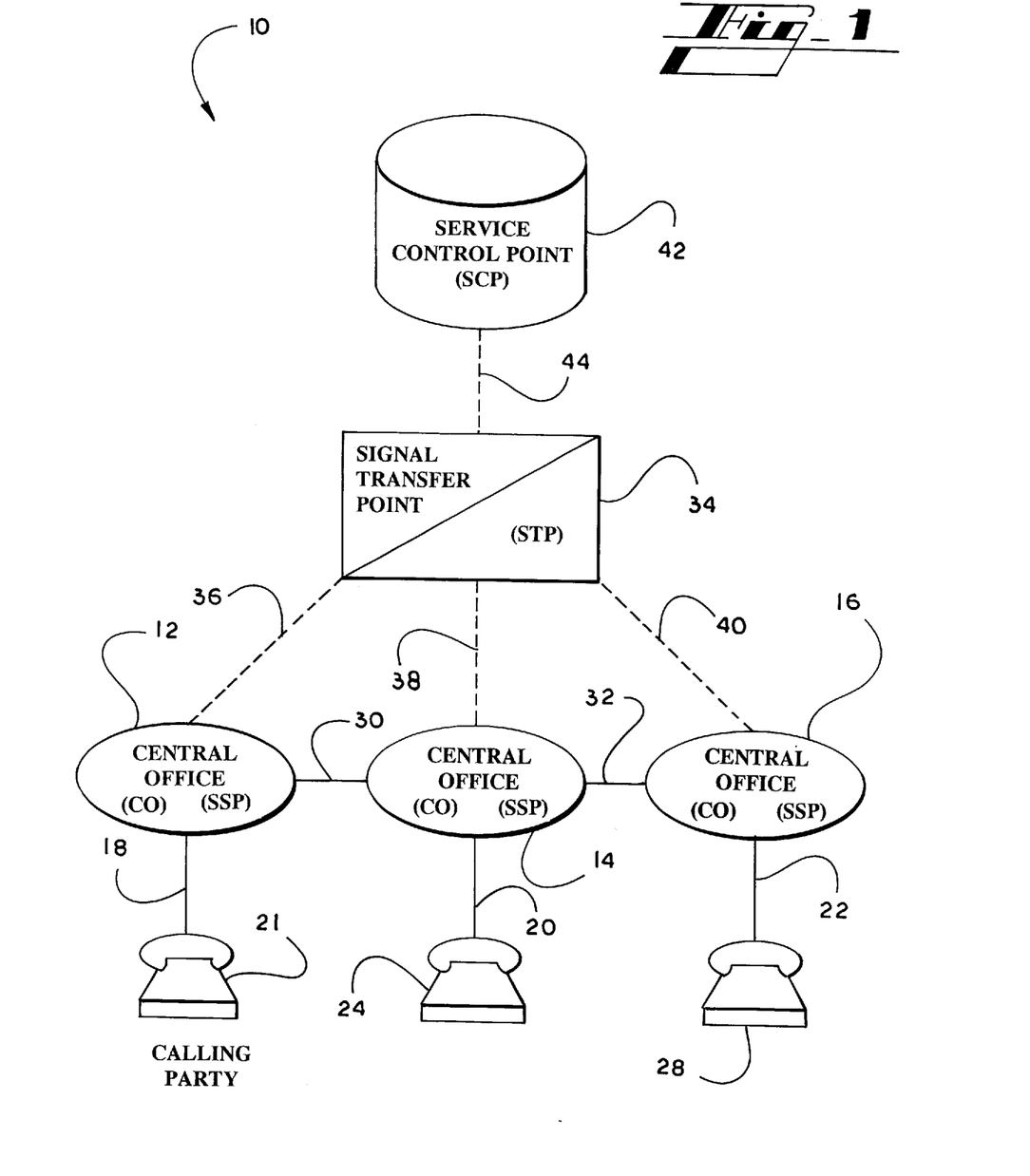
FIG. 1 is a block diagram of a portion of the existing advanced intelligent network (AIN) in a telephone system that forms the environment of the present invention.

The public switched telephone network that evolved in the 1980s was designed by AT&T. It is commonly referred to as the advanced intelligent network (AIN). Such an advanced intelligent network is shown in FIG. 1. The advanced intelligent network, as a part of the modern public switched telephone network, forms the environment of the present invention. Therefore, it is helpful to briefly describe the AIN and its architecture in order to have a complete understanding of the objects and advantages of the present invention.

Referring to FIG. 1, the AIN enables telecommunications call control and database access from any computer or switching system connected to the Signaling System 7 (SS7) network. The SS7 network refers to the current implementation of the control network used in the United States. The advanced intelligent network (AIN) is a standard call control protocol that uses the SS7 network for message transport.

Much of the intelligence and the basis for many of the new enhanced features of the network reside in a local service control point (SCP) 42. As is known to those skilled in the art, service control points are physically implemented by relatively powerful fault tolerant computers. Among the functions performed by the service control points is maintenance of network data bases used in providing enhanced services. Service control points include data bases that identify customers requiring particular services. In order to keep the processing of data and calls as simple and generic as possible at switches, a relatively small set of triggers are defined at the switches for each call.

A trigger in the network is an event associated with a particular subscriber line or call that generates a data packet to be sent to a service control point. The trigger causes the service control point to query its data base to determine whether some customized calling feature or enhanced service should be implemented for this particular call, or whether conventional plain dialed-up telephone service should be provided for the call. The results of the data base inquiry are sent back to the switch 12 from the SCP 42. The return message includes instructions to the switch as to how to process the call. The instruction may be to take some special action as a result of a customized calling service or enhanced feature. If no return message is received at the switch from the SCP 42, the call is treated as a conventional plain dialed-up telephone services type call. In response to receiving the latter type message, the switch will move through its call states, select the call digits, and may generate further messages that will be used to set up and route the call, as described herein above.

In the modern public switched telephone network, local switches may include both AIN based facilities (hardware and software) and non-AIN based facilities. The AIN based facilities are used to process calls that require enhanced services provided by the AIN, while non-AIN based facilities may be used to process calls that do not require the enhanced services of the advanced intelligent network. In many of these switches, separate switch announcement facilities (hardware and software) are maintained for the AIN portion of the switch and for the non-AIN portion of the same switch. A problem presented by this system architecture is that when a call that utilizes AIN services requires announcement treatment, it may only be directed to the AIN switch announcement facilities and may not be directed to a non-AIN switch announcement facilities. This is the case even if non-AIN switch announcement facilities with the desired announcement message format exists at the same switch. This is particularly problematic where the local switch contains AIN based communications facilities, but does not contain an appropriate AIN switch announcement capability.

Some prior art systems provide digital central office switches that eliminate the distinction between the AIN based announcement facilities and the non-AIN based announcement facilities. Although these switches solve the problem presented by the incompatibility of the AIN based facilities with the non-AIN based facilities, it is prohibitively expensive to replace existing switches in order to provide desired announcement capability where non-AIN announcement capability already exists at the switches. Because many switches exist with separate AIN and non-AIN AIN switch announcement capability, it would be useful to utilize the non-AIN switch announcement facilities in AIN services communications without the need to retrofit existing switches with new equipment and software.

Accordingly, there is a need in the art for a method and system for utilizing non-AIN based switch announcement facilities in AIN based services. Further, there is a need in the art for a method and system for utilizing non-AIN based switch announcement facilities in AIN based services that does not require exhaustive and expensive retrofitting of existing local switches.

SUMMARY OF THE INVENTION

The present invention satisfies the above described needs by providing a method and system for providing an announcement to a calling party from a non-intelligent network facilities within an intelligent network environment. The method and system of the present invention utilize regular non-intelligent network announcement facilities within an intelligent network by routing communications requiring announcement treatment from the intelligent network facilities of a local switch to the non-intelligent network facilities of the switch. Alternatively, communications requiring announcement treatment may be routed from the intelligent facilities of a local switch to the non-intelligent announcement facilities of a separate switch which will provide an announcement to the calling party via voice circuit connection.

Generally described, the present invention provides a method of providing an announcement to a calling party in an intelligent switched telephone network utilizing regular non-intelligent network announcement capability. The intelligent switched telephone network includes a calling party's switch and a service control point. The service control point is functionally connected to the switch and includes a database of directory numbers.

In the method of the present invention, a communication from a calling party made to a directory number is received at the calling party's switch. Identification information associated with the communication is read by the calling party's switch which provides the information to the service control point. The service control point reads the identification information provided by the switch and determines whether the communication requires announcement treatment. If the service control point determines announcement treatment is required, the service control point sends instructions to the calling party's switch for providing an announcement to the calling party. Once the calling party's switch receives the instructions from the service control point, the intelligent network facilities, resident at the calling party's switch, route the communication to the non-intelligent network facilities which provide an announcement to the calling party. Preferably, a regular non-intelligent switch announcement frame is resident in the non-intelligent network facilities at the switch and provides the announcement to the calling party.

Alternatively, the non-intelligent network facilities may be located at a second switch, and the intelligent network facilities at the calling party's switch route the communication to the non-intelligent network facilities at the second switch. The non-intelligent network facilities, located at second switch, may then provide an announcement to the calling party via a voice circuit.

Additionally, the present invention provides a system for providing an announcement to a calling party in an intelligent switched telephone network utilizing regular non-intelligent network announcement capability. The system of the present invention comprises a calling party's switch operative to receive a communication in the intelligent switched telephone network, where the communication is directed to a directory number. The calling party's switch is operative to read identification information associated with the communication. Responsive to the identification information, the calling party's switch is operative to provide the identification information to a service control point.

The service control point is functionally connected to the switch and includes a database of directory numbers. The service control point is operative to read the identification information and to determine whether the communication requires announcement treatment. If the service control point determines the communication requires announcement treatment, the service control point is operative to send instructions to the calling party's switch for providing an announcement to the calling party.

At the calling party's switch, intelligent network facilities are operative to receive the instructions from the service control point and, in response to the instructions, to route the communication to the non-intelligent network facilities. The non-intelligent network facilities preferably are located at the calling party's switch and include a regular non-intelligent switch announcement frame and are operative to provide an announcement to the calling party.

Alternatively, the non-intelligent network facilities may be located at a second switch. In this embodiment of the present invention, the intelligent network facilities at the calling party's switch are operative to route the communication to the non-intelligent network facilities at the second switch. The non-intelligent network facilities, located at the second switch, are operative to provide an announcement to the calling party at the calling party's switch via a voice circuit.

Accordingly, it is an object of the present invention to provide an efficient method of utilizing non-intelligent switch announcement capability in an intelligent switched telephone network.

It is another object of the present invention to provide a system for providing an announcement to a calling party in an intelligent switched telephone network utilizing regular non-intelligent switch announcement capability.

These and other objects, features, and advantages of the present invention will become apparent upon review of the following detailed description and the attached drawings.

DETAILED DESCRIPTION

Stated generally, the method and system of the present invention allow the use of non-AIN based switch announcement facilities for the provision of an announcement to a calling party where the calling party's communication is an AIN services communication. The terms caller and calling party are used to indicate the party initiating a communication directed at a particular directory number.

Referring to FIG. 1, in a preferred embodiment of the present invention, a calling party initiates a communication directed to a particular directory number. A dialing plan trigger associated with the called number is assigned to the call at the calling party's local switch 12. The dialing plan trigger assigned at the calling party's switch sends a query to the service control point (SCP) 42 which searches its database for the existence of the directory number corresponding to the query. The SCP 42 then determines whether the communication initiated by the calling party requires announcement treatment. As will be understood by those skilled in the art, announcement treatment may be useful in a variety of situations such as when the communication initiated by the calling party is directed to an invalid number. For example, if the SCP 42 finds a matching entry in its database corresponding to the called number, the SCP 42 initiates a standard call protocol and connects the calling party to the directory number. However, if the SCP 42 fails to find a matching entry in its database for the directory number dialed by the calling party, the SCP 42 will instruct the calling party's switch to provide the calling party with an announcement that the number dialed by the calling party is an invalid number.

In order to utilize non-AIN based switch announcement facilities at the calling party's switch, the SCP's instructions to the calling party's switch will include a unique carrier identification code (CIC). As is well known to those skilled in the art, carrier identification codes (CIC) may be used for inter-exchange or inter-component routing of a communication. CICs are traditionally three or four digit codes which may be use by customers to reach the services of inter-exchange carriers. In the present invention, inclusion of the CIC in the SCP's instructions will cause the AIN based facilities at the calling party's switch, which receives the instructions from the SCP, to route the calling party's communication via a trunk group to the regular non-intelligent switch announcement frame 60 (FIG. 2) resident in the non-AIN based facilities at the calling party's local switch. The non-AIN based facilities then provide an announcement to the calling party.

As is well known to those skilled in the art, the regular non-intelligent switch announcement frame is a non-AIN based component that is equipped with hardware and/or software for creation of and play of a recorded announcement. It is readily understood that a variety of announcements may be provided to the calling party as required by the particular circumstances of a given communication initiated by the calling party. Also, as will be discussed below, it is readily understood that the AIN based facilities at the calling party's local switch may route announcement instructions from the SCP to a non-intelligent switch announcement frame located at a separate switch which may then provide the calling party with the desired announcement via a voice circuit trunk line.

Description of the Preferred Environment for the Present Invention

Referring now to the drawings, like numbers reference like parts or steps in the several figures. FIG. 1 is a block diagram representing at least a part of the advanced intelligent network (AIN) 10 of a typical local exchange carrier. As discussed above, the advanced intelligent network (AIN) is a standard call control protocol that uses the SS7 network for message transport. The components thereof are well known to those skilled in the art. The operation of many of the components of the advanced intelligent network is also described in U.S. Pat. No. 5,471,519 to Howe, et al. entitled "Communications Monitoring and Control System" and in the U.S. patent application, Ser. No. 08/543,513, entitled "Method of Providing a Recorded Message to a Telephone Caller When the Called Number is Busy," both of which are incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference and made a part hereof.

Figure 2:
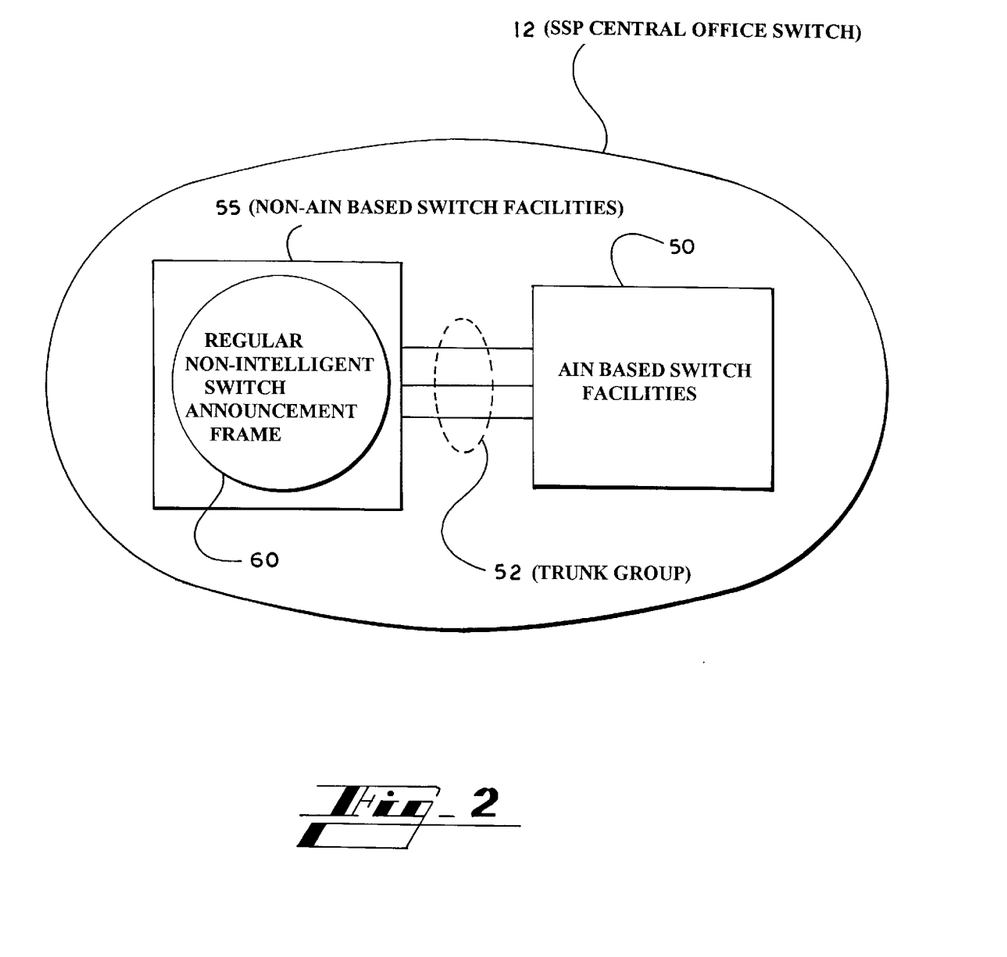
FIG. 2 is a block diagram illustrating the AIN based facilities and non-AIN based facilities resident in an AIN central office switch which forms a part of the network of FIG. 1.

A plurality of service switching point (SSP) central office switches is provided in a typical public switched telephone network. These are indicated in FIG. 1 as SSP central office switches 12, 14, and 16. The number of SSP central office switches depends on the number of subscribers to be served by the public switched telephone network. FIG. 2 is a block diagram of SSP central office switch 12 and depicts AIN based facilities and regular non-intelligent switch announcement equipment.

As seen in FIG. 2, the SSP central office switch 12 includes AIN based intelligent network facilities 50 and non-AIN network facilities 55. The non-AIN network facilities 55 includes a regular non-intelligent switch announcement frame 60. The regular non-intelligent switch announcement frame 60 is functionally connected to AIN based facilities 50 by trunk group 52. As is well known to those skilled in the art, SSP central office switch 12 may include other non-intelligent components for non-AIN services such as non-AIN call switching. Likewise, as is well known to those skilled in the art, the AIN based facilities 50 at the SSP central office switch 12 are equipped with appropriate hardware and software so that, when a set of predetermined conditions are detected, the SSP central office switch will initiate a trigger for a predetermined state of a call on a subscriber line, generate the trigger as an appropriate message to be sent out over the AIN, and suspend handling of a call until it receives a reply from the network instructing it to take certain action. As discussed in the background section, above, a trigger is an event that is associated with a particular call (in this case, associated with the local polling service) and that generates a data packet to be sent to the service control point (SCP). The SSP central office switch will have a default task to execute if a time out occurs and no response is provided by the AIN to the query made by the SSP central office switch.

SSP central offices switches 12, 14, and 16 have a plurality of subscriber lines 18, 20, and 22 connected thereto. Typically, the number of subscriber lines for each SSP central office switch will be on the order of 10,000 to 70,000 lines. Each of the subscriber lines 18, 20, and 22 is connected to a terminating piece or pieces of customer premises equipment that are represented by a like plurality of telephone sets 21, 24, and 28.

SSP central office switches 12, 14, and 16 are connected by a plurality of trunk circuits indicated as 30 and 32 in FIG. 1. These are the voice path trunks that interconnect the central offices 12, 14, and 16 and over which calls are connected when completed. It should be understood that central office trunking in a typical urban environment is not limited to a daisy chain arrangement implied by FIG. 1. In other words, in a typical network, trunk circuits will exist between SSP central office switch 12 and SSP central office switch 16. Therefore, when a local call is made between two central offices and if a direct trunk connection that is not busy exists between the offices, the network will assign that trunk to the completion of that particular call. If there is no direct trunking between the two central offices or if the direct trunks are all in use, the call will be routed along trunks from the originating central office to at least one other central office, and through subsequent trunk connections on to the terminating central office.

This general architecture is magnified when a wider geographic area that includes multiple local exchange carriers is considered. In that case, the only significant difference is that certain inter-exchange carrier switches that switch nothing but long distance trunk circuits are included.

Most of the intelligence of the advanced intelligent network resides in the remaining components shown in FIG. 1. These are the computers and switches that embody the current version of the common channel interoffice signaling scheme mentioned in the background section above. Each of SSP central office switches 12, 14, and 16 is connected to a local signal transfer point (STP) 34 via respective data links 36, 38, and 40. Currently, these data links are 56 kilobit per second bi-directional data links employing a signaling protocol referred to as Signaling System 7 (SS7). The SS7 protocol is well known to those skilled in the art.

The SS7 protocol is a layered protocol wherein each layer provides services for layers above it and relies on the layers below to provide it with services. The protocol employs packets that include the usual beginning and terminating flags and a check bit. Additionally, a signal information field is provided that includes a variable length user specific data and a routing label. A service information octet is provided that identifies a priority of the message, the national network of the destination of the message, and the user name identifying the entity that created the message. Also, certain control and sequence numbers are included within the packet, the uses and designations of which are known to those skilled in the art and described in the above referenced ANSI specification.

All of the SS7 data packets from the SSP central office switches go to a signal transfer point (STP) 34. Those skilled in the art will recognize that signal transfer point 34 is simply a multi-port high speed packet switch that is programmed to respond to the routing information in the appropriate layer of the SS7 protocol, and route the packet to its intended destination. The signal transfer point is not normally, per se, the destination of a packet, but merely directs traffic among the other entities on the network that generate and respond to the data packets. It should be noted that signal transfer point devices such as STP 34 are conventionally installed in redundant pairs within the network so that if one device fails, its mate takes over until the first STP is able to return to service. In practice, there are redundant data links between each of SSP central office switches 12, 14, and 16 for enhanced reliability. For the sake of simplicity of the drawings, the redundant devices have not been illustrated in the drawing figures in this specification.

As previously discussed, much of the intelligence, and the basis for many of the new enhanced features of the network reside in the local service control point (SCP) 42 that is connected to signal transfer point 34 via SS7 data link 44. As is known to those skilled in the art, service control points, such as SCP 42, are physically implemented by relatively powerful fault tolerant computers. Typical implementation devices include the Star Server FT Model 3200 or the Star Server FT Model 3300, both sold by American Telephone & Telegraph Company. The architectures of these computers are based on Tandem Integrity S2 and Integrity S1 platforms, respectively. In most implementations of a public switched telephone network, service control points are also provided in redundant mated pairs in order to assure reliability and continued operation of the network.

The computing devices implementing service control points such as SCP 42 typically accommodate one to twenty-seven disk drives ranging from 300 megabytes to 1.2 gigabytes per drive, and have main memory on the order of 24 to 192 megabytes. Thus, it will be appreciated that these are large and powerful computing machines. Among the functions performed by the service control points are maintenance of network data bases used in providing enhanced services. The computers embodying the SCPs, such as SCP 42, can execute at a speed on the order of 17 million instructions per second. Using the SS7 protocol, this translates to about 50 to 100 transactions (query/response pairs) of network messages per second.

Service control point computers were initially introduced into the network to handle the necessary translations and billing transactions for the implementation of 800 number service, that is, toll free (to the caller) long distance service. An 800 number subscriber has at least one dial-up line number that is to be called when a call to that subscriber's 800 number is placed. There is no physical central office or area of the country that corresponds to the 800 area code. It is significantly more economical to provide a few central locations at which the lookup of the directory number for an 800 call can be made than to provide the translation information redundantly at many central office switches. Currently, service control points also include data bases for credit card call transactions.

Also, service control points, such as SCP 42, include data bases that identify particular service customers. In order to keep the processing of data and calls as simple and generic as possible at central office switches, such as SSP central office switches 12, 14, and 16, a relatively small set of triggers are defined at the SSP central office switches for each call. The triggers cause the service control point 42 to query its data base to determine whether some customized calling feature or enhanced service should be implemented for this particular call or whether conventional plain dial-up telephone service should be provide for the call. The results of the data base query are sent back to the switch from SCP 42 through STP 34. The return packet includes instructions to the SSP central office switch as to how to process the call. The instruction may be to take some special action as a result of a customized calling service or enhanced feature or may simply be an indication that there is no entry in its data base that indicates that anything other than plain telephone service should be provided for the particular call. In response to receiving the latter type message, the SSP central office switch will move through its call states, collect the called digits, and generate additional packets that will be used to set up and route the call, as described hereinabove. Similar devices for routing calls among various local exchange carriers are provided by regional signal transfer points (not shown) and regional service control points (not shown).

Operation of the Present Invention in the Preferred Environment

Figure 3:
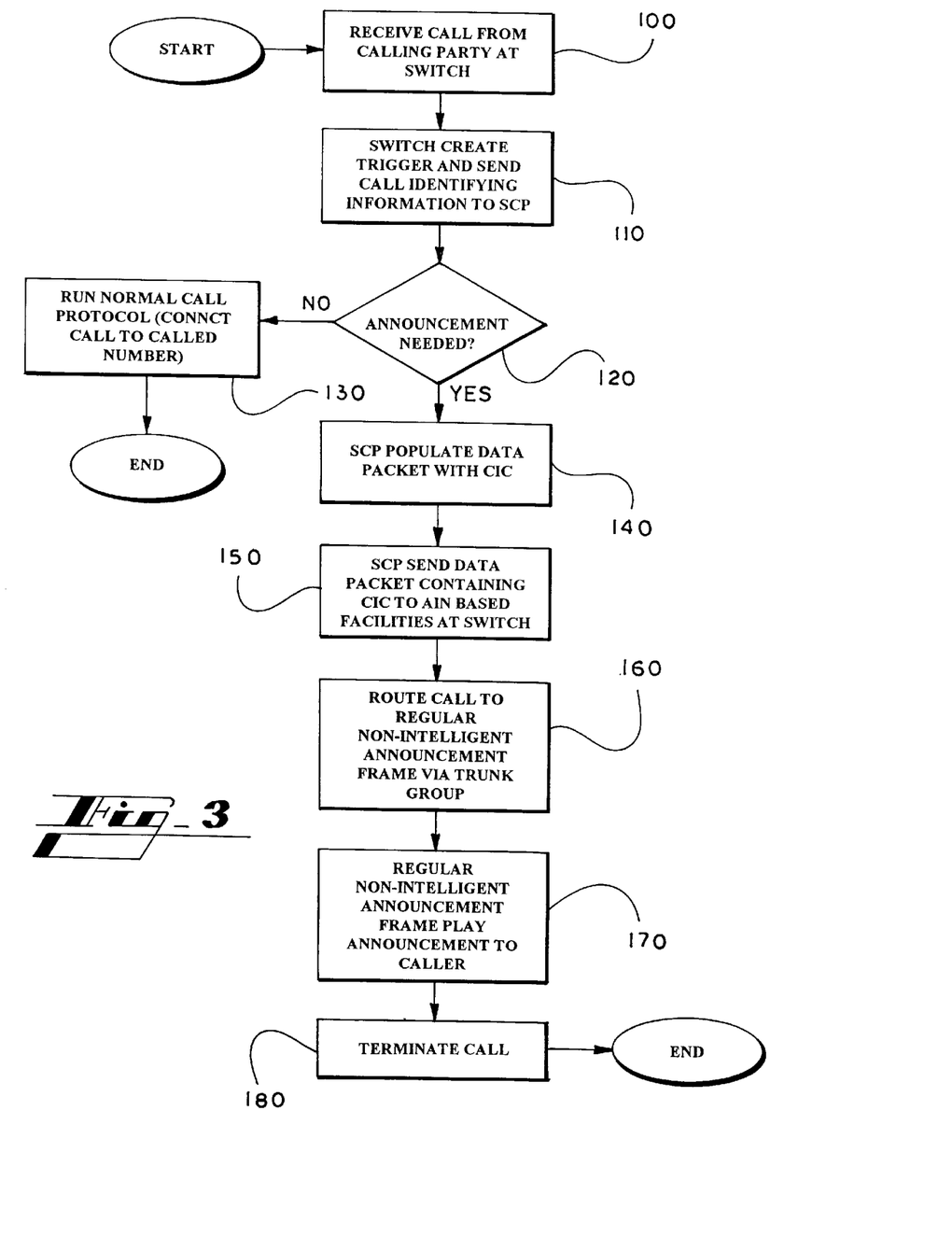
FIG. 3 is a flow chart illustrating the preferred method of the present invention.

The method of the present invention is best illustrated by showing, as an example, the method's handling of a call initiated by a calling party and directed to an invalid number. Those skilled in the art will understand that the method of the present invention will be useful in many other situations where a call requires announcement treatment. Referring now to the drawings, FIG. 3 is a flow chart showing the steps performed in the preferred embodiment of the present invention in handling a call directed to an invalid number. Numbered hardware components refer to FIGS. 1 and 2.

At step 100, a call initiated by a calling party from telephone set 21 is received at SSP central office switch 12 via line 18. At step 110, the SSP central office switch 12 assigns a dialing plan trigger associated with the dialed number being called by the calling party. The SSP central office switch 12 then transmits a packet of data associated with the trigger to the SCP 42 via data link 36, signal transfer point 34, and data link 44. The packet represents a query to the SCP 42 to determine whether the dialed number requires any sort of enhanced services or special handling.

At step 120, the service control point 42 queries its database to determine whether announcement treatment is needed for the call. If the SCP 42 determines that announcement treatment is not required, the method follows the "NO" branch at step 120 and proceeds to step 130 where the call will be connected to the dialed number according to some other call protocol according to the data packet received from SSP central office switch 12. The method of the present invention then terminates when the call is connected.

Returning to step 120, if the SCP 42 queries its database at step 120 and determines that announcement treatment is required, the method then follows the "YES" branch at step 120 to step 140. In this example, announcement treatment is required because the calling party has dialed an invalid number. At step 140, the SCP populates a data packet with a unique carrier identification code (CIC) for transmission back to the calling party's local switch, SSP central office switch 12. At step 150, SCP 42 sends the data packet containing the CIC to SSP central office switch 12.

At step 160, the AIN based facilities 50 at SSP central office switch 12 receive the data packet from SCP 42 and, in response to the carrier identification (CIC) received from SCP 42, the AIN based facilities 50 at SSP central office switch 12 routes the calling party's communication via trunk group 52 to the regular non-intelligent switch announcement frame 60 as shown in FIG. 2. Alternatively, as is well known to those skilled in the art, at step 160, the AIN based facilities 50, as shown in FIG. 2, may route the communication to a regular non-intelligent switch announcement frame located at a separate central office switch such as SSP central office switch 14, FIG. 1. The regular non-intelligent switch announcement frame at SSP central office switch 14 is not shown, but it is exemplified by the depiction of SSP central office switch 12 in FIG. 2.

At step 170, the regular non-intelligent switch announcement frame 60 plays the desired announcement to the calling party via line 18 and telephone set 21. In the alternative embodiment, as described above, once the regular non-intelligent switch announcement frame at SSP central office switch 14 receives the communication initiated by the calling party, at step 160, the regular non-intelligent switch announcement frame at SSP central office switch 14 will play an announcement to the calling party via trunk line 30. At step 180, the call is terminated at the conclusion of the announcement provided to the calling party.

While the present invention requires the routing of the communication to the non-intelligent switch announcement frame resident at the calling party's local switch or other designated switch, the present invention advantageously provides a method and system which allows for the utilization of non-AIN based facilities in AIN based services. Further, the present invention eliminates the need for exhaustive and expensive retrofitting of local central office switches with equipment and software required to eliminate the distinction between AIN based facilities and non-AIN based facilities. While this invention has been described in detail with particular reference to the preferred embodiments thereof, it will be understood that variations and modifications can be effected within the spirit and scope of the invention as described hereinabove and as defined in the appended claims.

What is claimed is:

1. In an intelligent switched telephone network, including a switch and a service control point, a method for providing an announcement utilizing non-intelligent network facilities comprising the steps of:

receiving at said switch a communication from a calling party to a directory number;

causing said switch to read identification information associated with said communication and to provide said identification information to said service control point;

causing said service control point
    to read said identification information,
    to determine, in response to said identification information, whether said communication requires announcement treatment, and
    in response to said communication requiring announcement treatment, to send instructions to said switch for providing an announcement to said calling party; and at said switch,
    causing intelligent network facilities located at said switch to route said communication via a trunk line to non-intelligent network facilities located at said switch, and
    causing said non-intelligent network facilities to provide an announcement to said calling party, wherein said identification information is transmitted from said switch to said service control point via a data signaling system;

wherein said instructions are sent from said service control point to said switch via said data signaling system; and wherein said non-intelligent network facilities at said switch are operative to provide said announcement without receiving instructions via said data signaling system.

2. The method of claim 1, wherein said step of causing said non-intelligent network facilities to provide an announcement to said calling party comprises causing a non-intelligent switch announcement frame located at said non-intelligent network facilities to provide said announcement to said calling party.

3. The method of claim 1, wherein said intelligent switched telephone network further comprises a second switch including non-intelligent network facilities, and wherein said intelligent network facilities at said calling party's switch route said communication to said non-intelligent network facilities at said second switch.

4. The method of claim 3, wherein said non-intelligent network facilities at said second switch provide an announcement to said calling party's switch via a voice circuit.

5. In an intelligent switched telephone network, a system for providing an announcement in an advanced intelligent network utilizing non-intelligent network facilities, comprising:

a calling party's switch including intelligent network facilities and non-intelligent facilities, said intelligent network facilities having a data communication facility for communicating with other intelligent network components via a data signaling system and said non-intelligent facilities being connected to said intelligent network facilities via voice trunk lines, said calling party's switch being operative to receive a communication from a calling party, said communication being directed to a directory number;

a service control point being functionally connected to said calling party's switch via said data signaling system, said service control point having a database of directory numbers;

said calling party's switch being operative to read identification information associated with said communication and being responsive to said identification information to provide said identification information to said service control point via said data signaling system;

said service control point being responsive to said identification information,
to read said identification information provided by said switch,
to determine, in response to said identification information, whether said communication requires announcement treatment, and
to send instructions via said data signaling system to said calling party's switch for providing an announcement to said calling party; and intelligent network facilities located at said calling party's switch being operative to receive said instructions via said data signaling system from said service control point and, in response to said instructions, to route said communication via voice trunk lines to non-intelligent network facilities located at said calling party's switch, said non-intelligent network facilities operative to provide an announcement to said calling party.

6. The system of claim 5, wherein said non-intelligent network facilities further comprise a non-intelligent switch announcement frame.

7. The system of claim 5, wherein said intelligent switched telephone network further comprises a second switch including non-intelligent network facilities, and wherein said intelligent network facilities at said calling party's switch are operative to route said communication to said non-intelligent network facilities at said second switch.

8. The system of claim 7, wherein said non-intelligent network facilities at said second switch are operative to provide an announcement to said calling party's switch via a voice circuit.

9. The method of claim 1, wherein said instructions comprise a unique carrier identification code.

10. The method of claim 9, wherein said switch routes said communication to said non-intelligent network facilities in response to said unique carrier identification code.

11. The method of claim 1, wherein said step of routing said communication to said non-intelligent network facilities includes routing said communication via a trunk group.

12. In a telecommunication network including intelligent network facilities and non-intelligent network facilities, said intelligent network facilities including data communication facilities for communicating with other intelligent network facilities via a data signaling system and said non-intelligent network facilities lacking data communication facilities and being connected to each other and to one or more intelligent network facilities via voice lines, a method of providing an announcement utilizing said non-intelligent network facilities, comprising the steps of:

receiving at a switch a communication from a calling party, said communication requiring announcement treatment after receiving instructions from the data signaling system;

causing intelligent network facilities located at said switch to route said communication via said voice trunk lines to non-intelligent network facilities located at said switch; and providing an announcement to said calling party;

wherein said non-intelligent network facilities at said switch are operative to provide said announcement without receiving instructions via said data signaling system.

13. The method of claim 12, further comprising the step of receiving at said switch information from said intelligent switched telephone network, said information indicating said communication requires announcement treatment.

14. The method of claim 12, further comprising the step of receiving at said switch information from said intelligent switched telephone network, said information indicating said communication requires announcement treatment, and wherein said intelligent network facilities, in response to said information, route said communication to said non-intelligent network facilities.

15. The method of claim 14, wherein said information comprises a unique carrier identification code.

16. The method of claim 12, wherein said step of causing said non-intelligent network facilities to provide an announcement to said calling party includes causing a non-intelligent network announcement frame located at said non-intelligent network facilities to provide said announcement to said calling party.

17. In an intelligent switched telephone network including a switch and a service control point, said switch including intelligent network facilities and non-intelligent network facilities, said intelligent network facilities having a data communication facility for communicating with other intelligent network components via a data signaling system and said non-intelligent network facilities being connected to said intelligent network facilities via a voice trunk group, said service control point being functionally connected to said switch and said service control point including a database of directory numbers, a method of providing an announcement utilizing said non-intelligent network facilities comprising the steps of:

receiving at said switch a communication from a calling party;

causing said switch to read identification information associated with said communication and to provide said identification information to said service control point via said data signaling system;

causing said service control point
to read said identification information,
in response to said identification information, to query its database to determine whether said communication requires announcement treatment, and
in response to said determination, to send instructions via said data signaling system to said switch for providing an announcement to said calling party; and at said switch,
  in response to said instructions, causing intelligent network facilities located at said switch to route said communication via a trunk group to non-intelligent network facilities located at said switch, and
  causing a non-intelligent switch announcement frame located at said non-intelligent network facilities to provide an announcement to said calling party;
  wherein said non-intelligent switch announcement frame is operative to provide said announcement without receiving instructions via said data signaling system.

18. The method of claim 17, wherein said instructions comprise a unique carrier identification code.

* * * * *